United States Patent [19]

Nemoto et al.

[11] Patent Number: 4,671,573

[45] Date of Patent: Jun. 9, 1987

[54] HEADREST DEVICE FOR A VEHICLE SEAT

[75] Inventors: Akira Nemoto; Takao Watanabe, both of Akishima, Japan

[73] Assignee: Tachikawa Spring Co., Ltd., Tokyo, Japan

[21] Appl. No.: 798,380

[22] Filed: Nov. 15, 1985

[30] Foreign Application Priority Data

Nov. 26, 1984 [JP] Japan .................................. 59-249097

[51] Int. Cl.⁴ ................................................ A47C 7/38
[52] U.S. Cl. ..................................................... 297/410
[58] Field of Search ........................ 297/410, 391, 396; 248/407, 408, 409, 423

[56] References Cited

U.S. PATENT DOCUMENTS

| | | | |
|---|---|---|---|
| 3,572,831 | 3/1971 | Barecki | 297/410 X |
| 3,979,150 | 8/1976 | Elzenbeck | 297/410 |
| 4,191,423 | 3/1980 | Göldner | 297/410 X |
| 4,256,341 | 3/1981 | Göldner et al. | 297/410 |

FOREIGN PATENT DOCUMENTS 58191  4/1985  Japan .................................. 297/410

Primary Examiner—Kenneth J. Dorner
Assistant Examiner—Mark W. Binder
Attorney, Agent, or Firm—Cushman, Darby & Cushman

[57] ABSTRACT

A headrest device for use with a seat in a vehicle such as an automobile is disclosed. In the headrest device, one of a headrest stay and a guide member into which the headrest stay is inserted is fixed to a headrest body, the other is fixed to a back frame of a seat back, a holder is slidably inserted between the headrest stay and guide member, the headrest stay is formed with a plurality of notches disposed axially at required intervals to allow the headrest body to be prevented against its downward movement relative to the seat back and is also provided with two stoppers respectively in the upper and lower portions thereof, the guide member and holder are respectively formed slits for insertion of a lock spring supported by the guide member and engageable with the notches in the headrest stay, and a cutaway portion for engaging and disengaging the lock spring is formed so as to continue from one of the slits, whereby the height of the headrest body can be adjusted by means of direct operation of the headrest body.

6 Claims, 17 Drawing Figures

FIG.5A  FIG.5B  FIG.5C
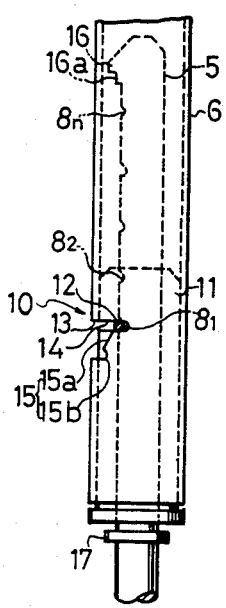
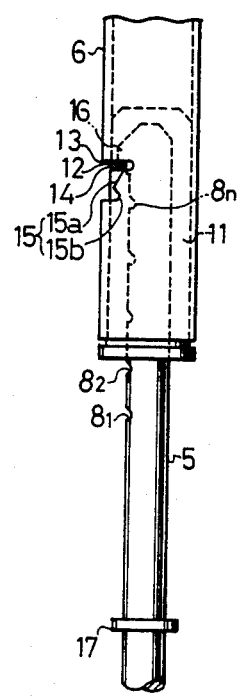
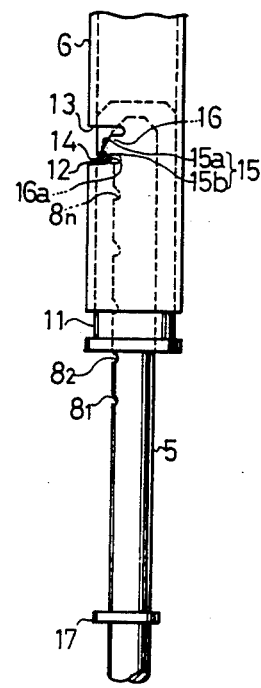
FIG.5D  FIG.5E
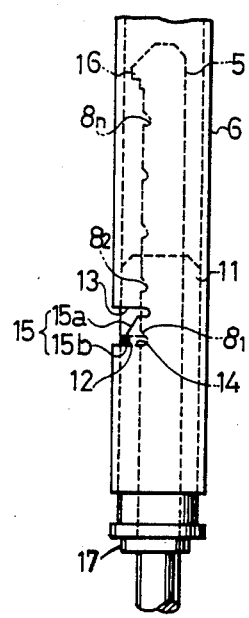
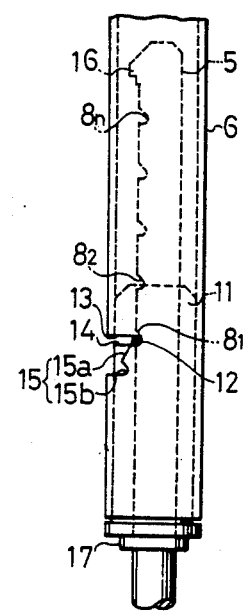

FIG.9A   FIG.9B   FIG.9C
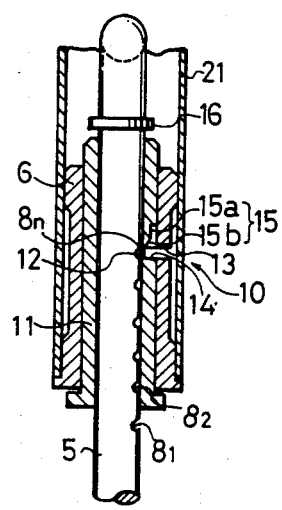 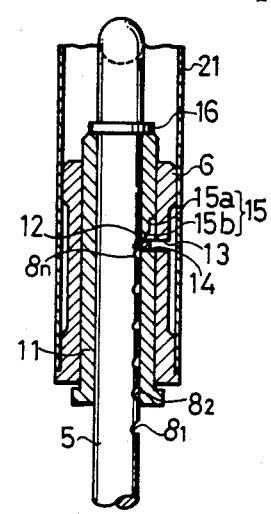 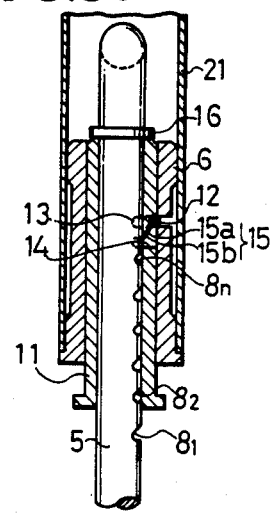
FIG.9D   FIG.9E
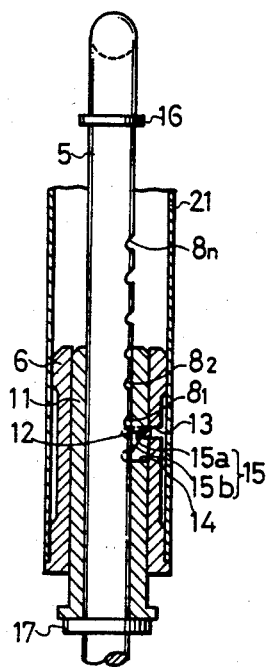 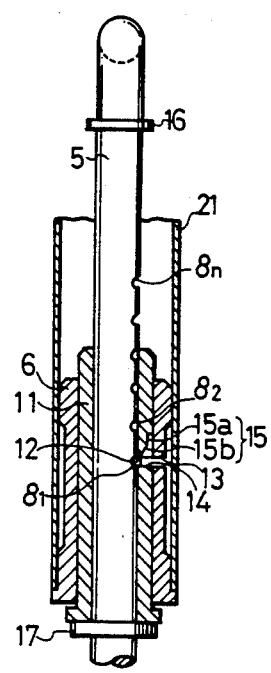

HEADREST DEVICE FOR A VEHICLE SEAT

BACKGROUND OF THE INVENTION

1. Field of the Invention

The present invention relates to a headrest device suitable for use with a seat in a vehicle such as an automobile, vessel, airplane and the like, especially suitable for use with an automotive seat.

2. Description of the Prior Art

Some of the conventional headrest devices of this type are equipped with a height adjustment mechanism which is capable of varying the height of the head-rest device so as to suit many occupants of different sitting heights or their tastes.

As an example of the headrest devices of the above-mentioned type, there is proposed a headrest device in Japanese Utility Model Publication No. 122923 of 1976. In this prior art device, headrest stays to be fixed to a head rest body are respectively provided with engagement step portions axially disposed at required intervals, and holders which are fixed to a seat back of a seat and through which the headrest stays are respectively inserted are formed with notches. A spring rod is engaged with one of the engagement step portions of the headrest stays through one of the notches to lock the stays with respect to the associated holders. If a lock removing lever is pressed or operated, then the inclined surface of a push piece provided in the lock removing lever is allowed to push the spring rod in a direction to move away from the stay engagement step portion, removing the locking of the stays. In this removed condition, the headrest body can be moved upwardly or downwardly together with the stays, that is, the headrest device can be adjusted in height.

In the above-mentioned prior art headrest device, however, the adjustment of the height thereof must be carried out with both hands since the lock removing operation to remove the spring rod from the stay engagement step portions and the operation to move the headrest body upwardly or downwardly are performed separately, which means that the headrest device is not good in operationability. Also, it is complicated in construction; for example, the lock removing lever must be equipped separately from the stay holders. Further, it requires a large number of parts, takes much labor in assembling, and is expensive in costs.

SUMMARY OF THE INVENTION

The present invention is devised in view of the drawbacks found in the above-mentioned prior art headrest device.

Accordingly, it is a primary object of the invention to provide an improved headrest device for use with a vehicle seat which is adjustable in height by removing a lock spring for locking two headrest stays from its locking conditions in connection with direct operation of a headrest body.

In attaining this object, according to the invention, one of a headrest stay and a guide member into which the headrest stay is inserted is fixed to a headrest body, and the other is fixed to a back frame of a seat back; a holder is slidably interposed between the headrest stay and the guide member; the headrest stay is formed with a plurality of notches located axially at required intervals to prevent the headrest body from moving downwardly relative to the seat back and is also provided with two stoppers in the upper and lower portions thereof; two slits for insertion of a lock spring which is supported by the guide member and is engageable with the notches of the headrest stay are respectively formed in the guide member and the holder; and, a cutaway portion linkable with one of the two slits for engagement or disengagement of the lock spring is formed in the guide member or in the holder.

In the headrest device constructed in the above-mentioned manner, when the headrest stay is fixed to the back frame and the guide member is fixed to the headrest body, each of the notches has such a configuration that the upper portion thereof is inclined and the lower portion thereof is cut away substantially horizontally, and the lower spring is engaged with one of the notches through the two slits respectively formed in the guide member and the holder, so that the guide member is secured or prevented against its downward movement relative to the headrest stay, that is, the headrest body is locked or prevented against its downward movement.

In this condition, when the headrest body is lifted up, then the guide member is moved upwardly integrally with the headrest body and thus, while maintained in engagement with both of the guide member slit and the holder slit, the lock spring is also disengaged out of its engaged notch, moved upwardly and brought into engagement with the next upper notch, so that the headrest body is locked in the one-step higher position.

In this way, when the headrest body is sequentially moved upward stepwise, it can be set in the respective step-wise higher positions. If the headrest body is further moved upwardly from the upper-most notch, then the lock spring is moved up beyond the upper-most notch of the headrest stay and is then secured by an upper stopper. If the guide member is moved further upwardly, then, since the holder is abutted against and secured by the upper stopper, the guide member is caused to slide relative to the holder and travel within the cutaway step portion formed in either the guide member or holder, so that the lock spring is disengaged from the headrest stay and thus the guide member together with the holder is free to slide downwardly with respect to the headrest stay.

Thus, the guide member is now slided integrally with the holder while the lock spring is being engaged. In this condition, if the headrest body is lowered down to its lower position, then the holder is abutted against a lower stopper. Then, if the headrest body is further pushed down, the lock spring is moved within the cutaway step portion and is then brought into engagement with the lower-most notch in the headrest stay through the guide member slit and the holder slit superposed on each other, so that the headrest body is locked in the lower-most position thereof.

Alternatively, when the headrest stay is fixed to the headrest body and the guide member is fixed to the back frame, although the notches in the headrest stay must be formed in the reversed direction and the engaging-/disengaging cutaway step portion must be formed in the opposite direction with respect to the slit formed in the guide member or in the holder, the headrest body also can be locked or prevented against its downward movement and can be moved upwardly so that the height thereof can be varied or adjusted in a similar manner as mentioned above. Also, when the headrest body is lifted further upwardly from its upper-most lock position, then it can be removed from its locked condition. Then, in this status, the headrest body can be lowered down to the lower-most position and thus can be locked in the lower-most position thereof.

Thus, according to the invention, the headrest body can be adjusted in height by means of direct operation of the headrest body itself.

The above and further objects and novel features of the invention will more fully apparent from the following detailed description when the same is read in connection with the accompanying drawings.

BRIEF DESCRIPTION OF THE DRAWINGS

FIGS. 5a–5e illustrates side views of the above embodiment of the invention, explaining the operation thereof;

DETAILED DESCRIPTION OF PREFERRED EMBODIMENTS OF THE INVENTION

Figure 1:
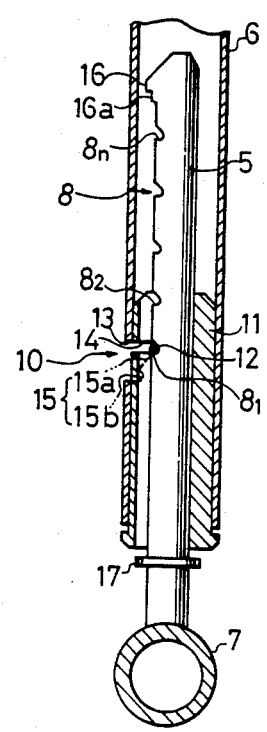
FIG. 1 is a section view of main portions of an embodiment of the invention.
Figure 2:
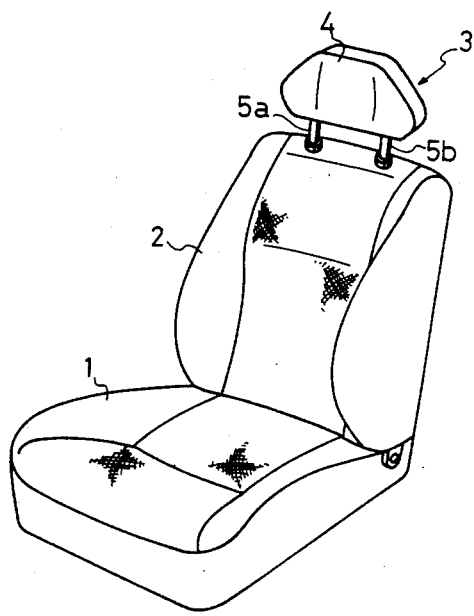
FIG. 2 is a perspective view of a vehicle seat provided with a headrest device constructed in accordance with the invention.
Figure 3:
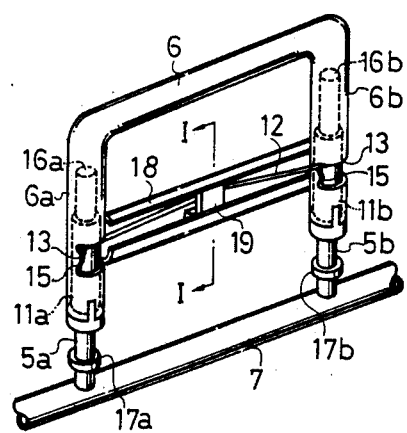
FIG. 3 is a perspective view of the interior structure of the above-mentioned embodiment of the invention.

In the drawings, (1) designates a seat cushion, (2) represents a seat back and (3) denotes a headrest device.

The headrest device (3) is constructed in accordance with the present invention and a first embodiment thereof will be described in connection with FIG. 1 and FIGS. 3-5.

The headrest device (3) comprises a headrest body (4) and a pair of headrest stays (it is referred to as stay(s) hereinafter) (5) [(5a), (5b)]. The headrest body (4) is formed of a panel covered with a pad member and a trim cover assembly, to which panel is fixed a guide member formed by bending a pipe material into an inverted U-shaped configuration. The stays (5) are located vertically so as to correspond to the two side portions (6a), (6b) of the guide member (6) and thus can be inserted into the two side portions (6a) (6b) of the guide member (6), while the stays (5) are respectively formed with a plurality of notches (8) [(8$_1$), (8$_2$)-(8$_n$)] spaced axially at required intervals for prevention of the respective stays against the downward movements thereof.

Between the above-mentioned stays (5) and guide member (6), there is provided a lock mechanism (10) which comprises a pair of holders (11) [(11a), (11b)] interposed between the stays (5) and guide member (6) and a lock spring (12) engageable with the notches (8) through the guide member (6) and the holders (11). The holders (11) are respectively adapted to be brought into sliding contact with the stays (5) with almost no friction and to be brought into sliding contact with the guide member (6) with a great friction force. Each side portion of the guide member (6) and each holder (11) are respectively formed with slits (13) and (14) which can be communicated with each other to correspond to any one of the notches (8) in each stay (5). The guide member (6) is also formed in each side portion thereof with a cutaway portion (15) which continues downwardly from the slit (13) and serves to engage or disengage the lock spring (12). The cutaway portion (15) comprises an inclined section (15a) directly continuing from the slit (13) and a recessed step section (15b) formed in the end of the inclined section.

In the upper end portion of each stay (5), that is, upwardly of the upper-most notch (8$_n$) of the stay (5), there is provided a projection-like stopper (16), which is formed in the lower portion thereof with a step portion (16a) that corresponds to the recessed step section (15b) of the cut-away portion (15) in the guide member (6). In the lower portion of each stay (5), that is, downwardly of the lower-most notch (8$_1$) thereof at intervals substantially equal to or more than the distance between the lower end surface of the holder (11) and the slit (14) in the same holder (11), there is fixed a flange-like stopper (17).

Figure 4:
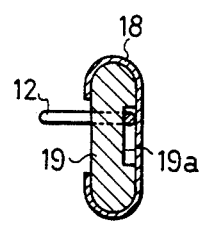
FIG. 4 is an enlarged section view taken along line I—I in FIG. 3.
Figure 6:
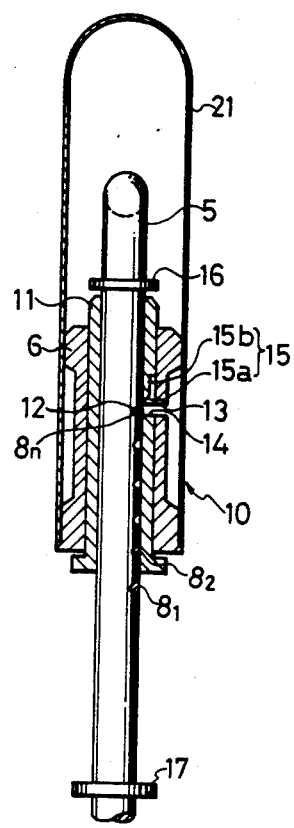
FIG. 6 is a section view of main portions of another embodiment of the invention.
Figure 8:
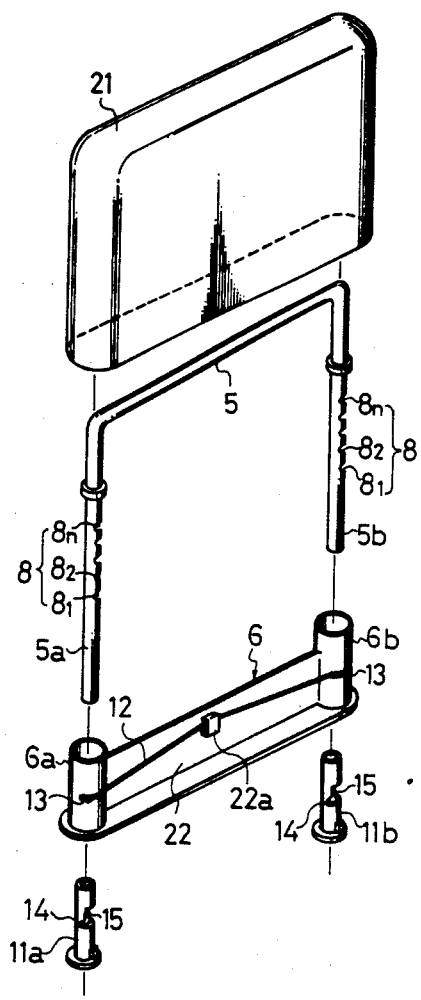
FIG. 8 is an exploded perspective view of the second embodiment of the invention; and, FIGS. 9a–9e illustrate section views of the second embodiment of the invention, explaining the operation thereof.
Figure 7:
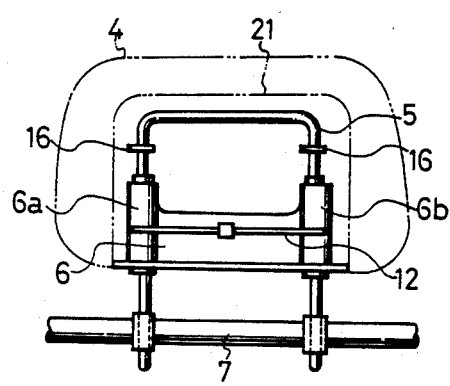
FIG. 7 is a front view of the interior structure of the second embodiment of the invention.

A support plate (18) is extended between the two side portions (6a), (6b) of the guide member (6) and is fixed thereto so as to correspond to the cutaway portions (15). The lock spring (12) is supported by a spring receiver (19) to this support plate (18) in the cental portion thereof such that the two ends thereof respectively correspond to the two side portions (6a), (6b) of the guide member (6). The spring receiver (19) is formed with a vertically extending recessed portion (19a) which allows the lock spring (12) to move from the slits (13) to the recessed step sections (15b) of the cutaway portions (15), (FIG. 4).

Accordingly, the two ends of the lock spring (12) are normally biased inwardly of the guide member (6) and thus can be brought into engagement with any one of the notches (8) of the stay (5) through the slit (13) of the guide member (6) and the slit (14) of the holder (11), so that the guide member (6) and the holder (11), that is, the headrest body (4) can be locked relative to the stays (5).

Now, we will describe the height adjustment or the operation of the thus-constructed headrest device or the first embodiment of the invention in connection with FIG. 5.

First, as shown in FIG. 5A, when the headrest body (4) is located in the lowest position thereof, the lock spring (12) is engaged with the lower-most notch (8$_1$) in the stay (5). In this state, if the headrest body (4) is directly lifted up, then the lock spring (12), while it is maintained in engagement with the respective slits (13) and (14) in the guide member (6) and holder (11), is moved upwardly against the biasing force thereof along the upper inclined portion of the notch (8$_1$) in the stay (5) to run on the circumferential surface of the stay (5), and, after it is passed over the stay circumferential surface, it is dropped into the next higher notch (8$_2$) and is engaged therewith. In this state, the lock spring (12) is now abutted against the lower horizontal portion of the notch (8$_2$) and thus it is prevented against its downward movement, so that the headrest body (4) is locked there to be prevented against its downward movement, that is, it is now set in another position which is one step higher.

In this way, the headrest body (4) can be set in its higher positions step by step by directly lifting it upwardly up to the hightest lock position thereof in which the lock spring (12) is engaged with the upper-most notch ($8_n$). In this state, if the headrest body (4) is lifted up further, then the lock spring (12) is abutted against and engaged with the projection-like stopper (16) in such a manner that it is caused to run and stay on the step portion (16a) of the stopper (16), (FIG. 5B). In this state, if the headrest body (4) is lifted up still further, then only the guide member (6) is moved upwardly since the cutaway portion (15) of the guide member (6) corresponds to the lock spring (12) but the slit (14) of the holder (11) is engaged with the lock spring (12) in a vertical direction. Therefore, the lock spring (12) is moved upwardly along the inclined section (15a) of the cutaway portion (15) while it is pushed in a direction to go away from the stay, and is brought into engagement with the recessed step section (15b) of the cutaway portion (15) so that it is held in a condition away from the stay (5). That is, the headrest body (4) is held in the lock removed condition thereof, while the holder (11) is held by means of friction relative to the guide member (6), (FIG. 5C).

Then, in this state, if the head-rest body (4) is depressed, then the guide member (6) is also lowered together with the holder (11) along the stay (5). This downward movement is carried out almost due to the dead load of the headrest body (4) since the holder (11) has substantially no friction with respect to the stay (5). When the headrest body (4) is lowered down to the lower portion of the stay (5), then the lower end surface of the holder (11) is abutted against the flange-like stopper (17) and thus the holder (11) is secured thereto, while the lock spring (12) is also stopped in this position. In this state, the slit (14) is located so as to correspond adjacently to the lower-most notch ($8_1$) in the stay (5), (FIG. 5D).

In this state, if the headrest body (4) is further lowered down, then the guide member (6) is also moved down within a range that the cutaway portion (15) thereof corresponds to the lock spring (12). And, when the slit (13) thereof is located in such a position as to correspond to the slit (14) of the holder (11), then the lock spring (12) is engaged with the lower-most notch ($8_1$) in the stay (5) from the slit (13) through the slit (14) of the holder (11), that is, the lock spring (12) is returned to its original position, so that the headrest body (4) is now held in the lower-most position thereof, (FIG. 5E).

Accordingly, the headrest body (4) can be varied in height through the above-mentioned operations from its lower positions to its higher positions. In order to change the height of the headrest body (4) from its intermediate position to its lower position, the headrest body (4) is once lifted up to its highest locking position; it is further lifted up from this highest lock position to hold the lock spring (12) in the lock removed condition thereof; it is thereafter lowered down to its lowest position; and, it is lifted up again to a desired position.

Next, we will describe another embodiment of the invention in connection with FIGS. 6-9.

In this embodiment, a guide member (6) is attached to an opening of a box-like panel (21) of a headrest body (4), which panel is open in the lower portion thereof. A headrest stay (it is referred to as a stay hereinafter) (5) is bent formed in an inverted U-shaped configuration and includes two side portions (5a), (5b) which are respectively adapted to be insertable from above into tubular guide portions (6a), (6b) of the guide member (6). Each of the two side portions (5a), (5b) of the stay (5) is formed with notches (8) [($8_1$), ($8_2$)–($8_n$)] as in the above-mentioned first embodiment of the invention.

The two tubular guide portions (6a), (6b) of the guide member (6) are interconnected with each other by a support plate (22) and are fixed to the panel (21), and a lock mechanism (10) is provided between these tubular guide portions (6a), (6b) and the stay (5) [(5a), (5b)]. Specifically, in this lock mechanism (10), a pair of holders (11) [(11a), (11b)], which are inserted between the stay (5) and the guide member (6), are adapted to be in sliding contact with the stay (5) with substantially no friction but with the guide member (6) with a great friction force, as in the above-mentioned first embodiment; the guide member (6) and the holder (11) are respectively formed with slits (13) and (14) which can be communicated with each other to correspond to one of the notches (8) in the stay (5); the holder (11) is also formed with a cutaway portion (15) which is located to continue upwardly from the slit (14) and serves to engage or disengage a lock spring (12); and, the cutaway portion (15) comprises an inclined section (15a) continuing directly from the upper edge of the slit (14) and a step section (15b) extending upwardly from the inclined section (15a).

Also, upwardly and downwardly of the portion of the stay (5) where the notches are formed, flange-like stoppers (16) and (17) are fixedly provided, respectively. That is, the upper stopper (16) is fixed to a position which is located upwardly of the upper-most notch ($8_n$) at intervals greater than the distance between the upper end surface of the holder (11) and the slit (14), and the lower stopper (17) is fixed to a position which is disposed downwardly of the lower-most notch ($8_1$) at intervals substantially equal to the distance between the lower end surface of the holder (11) and the slit (14).

The lock spring (12) is mounted to a support plate (22) of the guide member (6) such that the two ends thereof are located so as to correspond to the slits (13) in the two tubular guide portions (6a), (6b), and also such that the central portion thereof is supported so as to be slightly movable in a vertical direction by a cut-and-raised piece (22a). The two ends of the lock spring (12) are normally biased inwardly of the guide member (6). When the two ends are passed from the respective slits (13) of the guide member (6) through the respective slits (14) of the holder (11) into the notches (8) in the stay (5) and are engaged therewith, then the guide member (6), that is, the tubular guide portion (6a), (6b) and the holder (11) are secured relative to the stay (5), so that the headrest body (4) is locked in a downward direction or it is prevented against its downward movement.

Now, we will described the height adjusting operation of the thus-constructed second embodiment of the invention in connection with FIG. 9.

In order to change the height of the headrest body (4), for example, to make it higher, similarly in the above-mentioned first embodiment of the invention, if the headrest body (4) is lifted up relative to the stay (5) fixed to the seat back (2), then the two ends of the lock spring (12) fixed to the guide member (6), while they remain engaged with the slits (13), (14) in the tubular guide portions (6a), (6b) and holder (11), are disengaged out of the notches (8) in the stay (5) or moved upwardly, and are caused to run on the circumferential surfaces of the two side portions (5a), (5b) of the stay (5); and, if the headrest body (4) is further lifted up, then the two ends of the lock spring (12) can be sequentially brought into engagement with other higher notches ($8_n$) in the upper portion of the stay (5), (FIG. 9A). In this way, the headrest body (4) can be raised upwardly and engaged or prevented against its downward movements at its respective locked position. That is, the height of the headrest body (4) can be changed and set at its higher positions in such a manner that it is locked or prevented from moving downwardly at its respective engaged positions.

As shown in FIG. 9B, if the headrest body (4) is lifted further upwardly from its highest lock position, then the upper end of the holder (11) is abutted against and secured to the upper stopper (16); and, if the headrest body (4) is lifted up still further, both ends of the lock spring (12) are moved upwardly while maintained engaged with the slits (13) of the tubular guide portions (6a), (6b), are caused to run from the inclined sections (15b) of the cutaway portions (15) of the holders (11) onto the step sections (15a) thereof, and thus separated from the two side portions (5a), (5b) of the stay (5). That is, the lock spring two ends are now held in the lock removed conditions thereof, respectively, (FIG. 9C).

Then, in this state, if the headrest body (4) is pushed down with respect to the stay (5), then the holder (11) is also lowered down integrally with the guide member (6). In this case, since there is substantially no friction between the two side portions (5a), (5b) of the stay (5) and the holder (11) as well as there exists a great friction force between the holder (11) and the two tubular guide portions (6a), (6b) of the guide member (6), they are all allowed to move down due to the dead load of the headrest body (4).

When the holder (11) is lowered down to the bottom in this manner, then it is abutted against and secured to the lower stopper (17), (FIG. 9D). In this state, if the headrest body (4) is pushed down further, then the two ends of the lock spring (12) are moved downwardly within the cutaway portions (15) in the holder (11) while they are being gripped by the slits (13) of the two tubular guide portions (6a), (6b), and, when the slits (13) of the tubular guide portions (6a), (6b) are communicated with the slits (14) in the holder (11), they are respectively inserted into the slits (14) in the holder (11) and are abutted against the side surfaces of the two side portions (5a), (5b) of the stay (5), so that the lock spring (12) is brought into engagement with the lower-most notch (8$_1$), (FIG. 9E). In this state, by lifting the headrest body (4) upwardly, the height of headrest body (4) can be adjusted from the lower-most notch (8$_1$) to the higher notches sequentially in such a manner that it is engaged so as to be prevented against its downward movement; and thus, in this way, the headrest body (4) can be set at desired heights.

In the above-described two embodiments of the invention, the headrest stay (5) is fixed to the back frame (7) of the seat back (2) and the guide member (6) is fixed to the headrest body (4), whereby the height of the headrest body (4) can be adjusted with respect to the seat back (2) through the holder (11). However, according to the invention, the headrest stay (5) may be fixed to the headrest body (4) and the guide member (6) may be fixed to the back frame (7). Also, although the height adjustment mechanism (10) is provided in each of the two side portions (5a), (5b) of the headrest stay (5) in the above-described embodiments, the height adjustment mechanism may be equipped only in either one side portion (5a) or the other side portion (5b) as a so-called one-side lock mechanism.

As described hereinbefore, according to the invention, the headrest device is constructed such that the height of the headrest body can be adjusted by directly moving the headrest body in a vertical direction, and thus such adjustment can be performed by means of one-hand operation easily and quickly. Also, since the headrest body can be locked and unlocked simply by engaging and disengaging the lock spring, the invention requires a smaller number of parts and is simple in structure, resulting in the reduced weight and costs. Especially, the invention is very effective when it is applied a seat for a vehicle such as an automobile and the like.

What is claimed is:

1. A headrest device for a vehicle seat comprising, in combination:

a headrest body;

a pair of guide members fixed to said headrest body;

a pair of headrest stays each formed with a plurality of notches disposed axially thereof at required intervals for prevention of downward movements of said headrest body, said headrest stays being fixed to a seat back and being respectively inserted into said pair of guide members;

a lock mechanism between each said headrest stay and respective guide member, each said lock mechanism including:

(a) a holder member disposed between said headrest stay and said guide member so as to be in free sliding engagement with said headrest stay and in substantially great frictional sliding engagement with said guide member;

(b) a first slit formed in said guide member and a second slit formed in said holder member;

(c) lock spring means operatively coupled to said guide member and disposed so as to be engagable with at least one of said plurality of notches through said first slit and said second slit; and (d) a cut-away portion formed in said guide member so as to extend at an angle downwardly from said first slit, said cut-away portion being adapted to permit said lock spring means to be engaged with and disengaged from said at least one notch;

a first stopper formed in an upper portion of each of said headrest stays; and a second stopper formed in a lower portion of each of said headrest stays, whereby, when said headrest body is raised to a position where said lock spring means are positioned beyond an uppermost one of said notches, said lock spring means are abutted against said first stopper, and when said headrest body is raised further from said position, said spring means are abutted against a lower portion of said cut-away portion and are disengaged from said notches, thereby allowing said headrest body to be lowered while said lock spring means are maintained in said disengaged state, so that when said headrest body is lowered to a position where said holder member is abutted against said second stopper, said lock spring means are positioned at a point corresponding to a lower-most one of said notches and, when the headrest body is further lowered from said position, said lock spring means are caused to be engaged to said first slit as well as into said lowermost one of said notches.

2. The headrest device for a vehicle seat according to claim 1, wherein each of said plurality of notches is formed in a wedge-like configuration including a lower portion perpendicular to an axial direction of said headrest stay and an upper portion which is inclined, and wherein said inclined cut-away portion includes a recessed step portion.

3. The headrest device for a vehicle seat according to claim 2, wherein said lock spring means comprise a rod-like lock spring mounted at a central portion thereof by a spring receiver such that said lock spring means are movable from said first slits to said cut-away portion and said lock spring means are sized so as to be respectively fitted into said first slits.

4. A headrest device for a vehicle seat comprising, in combination:
 a headrest body;
 a pair of headrest stays each formed with a plurality of notches disposed axially thereof at required intervals for prevention of downward movements of the headrest body, said headrest stays being fixed to a seat back;
 a pair of guide members into which said pair of headrest stays are respectively inserted;
 a lock mechanism provided between each said headrest stay and respective guide member, each said lock mechanism including:
 (a) a holder member disposed between said headrest stay and said guide member so as to be in free sliding engagement with said headrest stay and in substantially great frictional sliding engagement with said guide member;
 (b) a first slit formed in said holder member and a second slit formed in said guide member;
 (c) lock spring means operatively coupled to said guide member and disposed so as to be engageable with at least one of said plurality of notches;
 (d) a cut-away portion formed on said holder member so as to extend at an angle upwardly from said first slit, said cut-away portion being adapted to permit said lock spring means to be engaged with and to be disengaged from said at least one notch;
 a first stopper formed in an upper portion of each of said headrest stays; and
 a second stopper formed in a lower portion of each of said headrest stays,
 whereby, when said headrest body is raised to a position where said holder member is abutted against said first stopper, said lock spring means are disengaged from an upper most one of said plurality of notches by means of said cut-away portions, and when said headrest body is further raised from said position said spring means are abutted against an upper portion of said cut-away portion and are put in a disengaged state from said notches, thereby allowing said headrest body to be lowered while said lock spring means are maintained in said disengaged state, such that when said headrest body is lowered to a position where said holder member is abutted against said second stop, further lowering of said headrest body causes said lock spring means to be engaged into said first slit as well as into a lowermost one of said notches.

5. The headrest device for a vehicle seat according to claim 4, wherein each of said plurality of notches is formed in a wedge-like configuration including a lower portion perpendicular to an axial direction of said headrest stay and an upper portion which is inclined, and wherein said inclined cut-away portion includes a recessed step portion.

6. The headrest device for a vehicle seat according to claim 4, wherein said lock spring means comprises a rod-like lock spring mounted to said guide member at a central portion thereof by a spring receiver such that said lock spring means are movable from said first slits to said cut-away portion and said lock spring means are sized so as to be respectively fitted into said first slits.

* * * * *